(12) United States Patent
Linhart et al.

(10) Patent No.: US 6,886,517 B2
(45) Date of Patent: May 3, 2005

(54) INTAKE DEVICE FOR AN INTERNAL COMBUSTION ENGINE HAVING IMPULSE CHARGING

(75) Inventors: Jochen Linhart, Waiblingen (DE); Michael Fasold, Leutenbach (DE)

(73) Assignee: Filterwerk Mann & Hummel GmbH, Ludwigsburg (DE)

(*) Notice: Subject to any disclaimer, the term of this patent is extended or adjusted under 35 U.S.C. 154(b) by 7 days.

(21) Appl. No.: 10/308,218

(22) Filed: Dec. 3, 2002

(65) Prior Publication Data

US 2003/0111035 A1 Jun. 19, 2003

(30) Foreign Application Priority Data

Dec. 3, 2001 (DE) .......................... 101 59 250

(51) Int. Cl.⁷ .............................................. F02M 35/10
(52) U.S. Cl. ................................................. 123/184.53
(58) Field of Search .................. 123/184.53, 184.54, 123/184.55, 184.57, 184.56, 184.31

(56) References Cited

U.S. PATENT DOCUMENTS

| 4,461,151 A | | 7/1984 | Kanesaka | |
| 4,738,233 A | * | 4/1988 | Hitomi et al. | 123/190.2 |
| 4,901,680 A | | 2/1990 | Matsumoto | |
| 4,986,225 A | * | 1/1991 | Wu et al. | 123/184.54 |
| 5,009,199 A | * | 4/1991 | MacFarlane | 123/184.54 |
| 6,422,184 B1 | | 7/2002 | Kreuter | |
| 6,435,152 B1 | * | 8/2002 | Leipelt et al. | 123/184.55 |

FOREIGN PATENT DOCUMENTS

| DE | 3737820 A | 8/1989 |
| DE | 19908435 A | 9/2000 |
| DE | 19932826 A | 1/2001 |
| EP | 0508508 A | 10/1992 |

* cited by examiner

Primary Examiner—Tony M. Argenbright
Assistant Examiner—Hyder Ali
(74) Attorney, Agent, or Firm—Crowell & Moring LLP

(57) ABSTRACT

An intake head device for an internal combustion engine, which is suitable for impulse charging and/or residual exhaust gas purging, including a pressure accumulator (24) which may apply overpressure to the pressure passage via a pressure passage, so that this produces residual exhaust gas purging of the cylinder (16) when the inlet valve (18) is open and the impulse flap (21) is closed. The impulse charging is performed by a partial vacuum which is generated in the accumulator passage (22) by the air intake of the cylinder (16). The pressure accumulator arrangement of the invention has the advantage that the closing time of the flap (21) may be longer.

15 Claims, 3 Drawing Sheets

INTAKE DEVICE FOR AN INTERNAL COMBUSTION ENGINE HAVING IMPULSE CHARGING

BACKGROUND OF THE INVENTION

The present invention relates to an intake device for an internal combustion engine, in which an additional closing element for dividing off an accumulator passage is provided in the intake passage.

The use of closing or sealing elements for the intake passages of internal combustion engines is generally known. In internal combustion engines, the achievement of impulse charging results in subjection of flap valves to severely demanding conditions. Impulse charging requires use of rapidly switching flap valves to achieve short switching times. To satisfy requirements established by thermodynamic calculations, switching times of 2 ms should be achieved in such cases.

The short switching times for impulse charging of internal combustion engines are necessary since the switching behavior of the flap must be adjusted to the supercharging process for the cylinder, which is a direct function of the valve opening times of the intake valve of the cylinder. Impulse charging is understood as a method in which the intake passage is temporarily sealed using a flap upstream of the intake valve of the cylinder, so that a partial vacuum results downstream of the flap during the intake stroke of the cylinder when the intake valve is open. If the flap is opened with a partial vacuum existing, the partial vacuum accelerates the released charging column of intake air behind the flap, as a result of which this air flows into the cylinder with a high impulse and causes greater filling of the combustion chamber. This method is described, for example, in Kreuter, U.S. Pat. No. 6,422,184 (=DE 199 08 435).

In order to implement this method, U.S. Pat. No. 6,422,184 describes a flap mechanism which is biased in the closing direction, whereby closure of the flap may be effected with the aid of an electromagnet. The flap is opened as a result of the partial vacuum which arises between the flap and the intake valve, in the region of the intake passage which is referred to as the accumulator passage.

To achieve the fast switching times described, however, a large expenditure for components is necessary. In particular, the closing of the closing element in the short time required causes problems, since the switching must be performed against the flow occurring in the intake tract.

However, the switching speed during closing is also of great importance, since in this way overpressure is to be generated in the passage section between the element and the intake valve. This overpressure is used for so-called residual exhaust gas purging in the cylinder upon opening of the intake valve, by which the exhaust gas residues may be completely removed from the combustion chamber before the outlet valve closes again.

SUMMARY OF THE INVENTION

It is an object of the present invention to provide an improved intake device, which can be used for residual exhaust purging or impulse charging.

It is also an object of the invention to provide an intake device with an additional sealing or closing element therein for residual exhaust purging or impulse charging.

Another object of the invention is to provide an intake device for residual exhaust purging or impulse charging which can be constructed at reasonable cost.

These and other objects are achieved in accordance with the present invention by providing an intake device for an internal combustion engine, said intake device comprising an inlet for combustion air, at least one intake passage per cylinder of the internal combustion engine, each intake passage extending to an outlet for connection to a cylinder intake; an intake valve for closing each outlet; a first closing element positioned in the intake passage upstream of the intake valve, said first closing element forming an accumulator passage from a part of the intake passage between said first closing element and the intake valve; a pressure accumulator which is connected to the accumulator passage via a connection passage, and a second closing element disposed in said connection passage.

The intake device according to the invention has, as is known, an intake passage that connects a combustion air inlet to outlets leading to the engine cylinders. In a broad sense, the term "intake device" as used herein embraces that section of the entire combustion air intake path which is needed for installation of an accumulator passage. The resulting accumulator passage in this case is that section which is located between an additional closing element in the intake device and the intake valve. Either overpressure for residual exhaust gas purging of the cylinder or a partial vacuum for impulse charging may be stored in this accumulator passage.

The present invention is distinguished in that a pressure accumulator is additionally provided, which is connected via a connection passage to the accumulator passage. In this way, an overpressure may be produced from the pressure accumulator, which may be used to fill the accumulator passage and build up an appropriate overpressure of, for example, 0.4 bar. This procedure is regulated by a second closing element, which is positioned in the connection passage. This closing element must reliably close off the connection line. In addition, the closing element may contain a non-return valve or check valve mechanism, which ensures that no air from the accumulator passage may flow back into the pressure accumulator. In this way, in accordance with the mechanism of impulse charging, the pressure accumulator may also build up a higher overpressure in the accumulator passage than is present in the pressure accumulator. The advantage of the construction described is that the first closing element in the intake passage is relieved by the pressure accumulator. In particular, the requirements for the sealing times are lower than without use of the pressure accumulator, since the overpressure may be built up via the pressure accumulator. Specifically, it is not necessary to close the impulse passage rapidly in order to build up overpressure in the accumulator passage using the cylinder (compare the description of FIG. 1 for this purpose).

However, the closing of the flap is significantly more critical precisely in the case of short switching times. In this case, care must also be taken that the flap itself comes to a stop on a sealing surface during the closing procedure, which causes strong braking. This leads to an extremely high mechanical stress on the flap and the bearings of the drive. This mechanical stress may be significantly reduced by extending the switching times allowed. In this way, the flap becomes more cost-effective to produce, functions more reliably, and has a longer service life.

In comparison to this, the opening times are significantly easier to achieve. The flap may swing into a clearance volume of the intake passage, in which its stopping may be damped. In addition, the opening of the flap is supported by the partial vacuum in the accumulator passage, at least if the flap is positioned with its axis of rotation outside the passage structure and swings in a clearance volume. Therefore, it is advantageous to construct the closing element as a pivot flap with a vane. However, this does not preclude designing the closing element as a two-vane valve having a central or an off-center axis of rotation.

In one advantageous refinement of the present invention, the closing element comprises a rotatable disk. This disk may be positioned in such a way that its axis of rotation lies outside the cross-section of the intake passage, so that by rotating the disk, an aperture which is positioned thereon may be brought into registration with the cross-section of the intake passage. This position is to be equated with the open position of the closing element. Through further rotation, the aperture may be moved outside the cross-section, whereby the intake passage is closed.

Alternatively, the closing element may also be constructed as a rotary valve. Such a valve comprises a cylindrical body which intersects the intake passage and is rotatably mounted. By rotating the cylindrical body, a passageway formed through the cylindrical body may be brought into alignment or registration with the cross-section of the intake passage to open the intake passage. Through further rotation, this registration or alignment is removed again, which closes the intake passage. If multiple intake passages are positioned parallel to one another, the rotary valves may lie on a shared axis of rotation. Furthermore, it is possible to integrate all the through holes on a single common roller body. This roller body may rotate in such a way that the intake passages are cycled open and closed in accordance with the phase displacement of the cylinder.

The use of rotary valves particularly makes continuous rotation of these components possible. In this way, the bearing forces that arise may be minimized further. The closing elements in the sealing passages may be driven by a component which rotates as a function of the speed of the internal combustion engine. For example, the rotary valves or the disks may be driven by the crankshaft or the camshafts of the engine.

An advantageous variant of the pressure accumulator results if the accumulator is fed by a secondary air pump or a secondary supercharger. This component is normally responsible for introducing fresh air into the exhaust system. However, this task only needs to be performed during cold starting of the internal combustion engine, i.e., during the initial minutes of operation. Subsequently, the secondary air pump or supercharger is available for another task. In this way, it is not necessary to provide an additional pump for the pressure accumulator, which increases the cost effectiveness of the proposed apparatus according to the present invention.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings, in which.

DETAILED DESCRIPTION OF PREFERRED EMBODIMENTS

Figure 1:
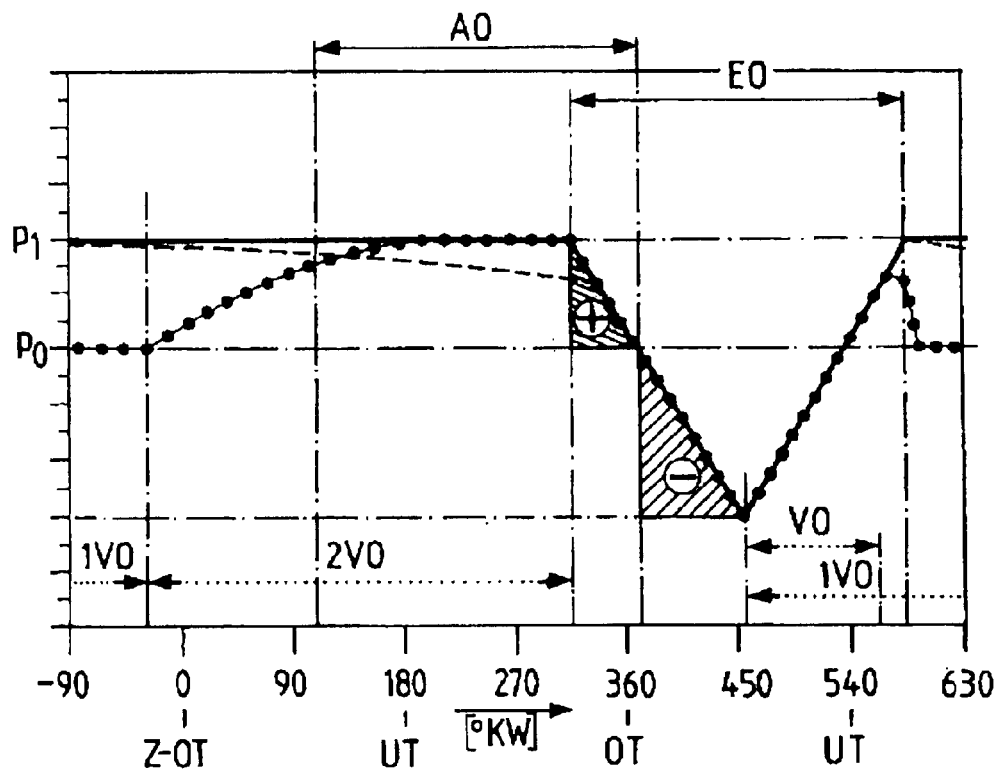
FIG. 1 is a graphic representation of the pressure distribution in the accumulator passage.

The procedure of residual exhaust gas purging and/or impulse charging may be seen in the graphic illustration of FIG. 1. The four strokes of an internal combustion engine are illustrated, with upper dead center at ignition (Z-OT), bottom dead center (UT), next upper dead center (OT), and last bottom dead center (UT). Furthermore, the time of opening of the outlet valve (AO) and the time of opening of the intake valve (EO) are illustrated. Finally, the switching time of a closing element according to the state of the art (VO) and the interaction of the first and second closing elements according to the present invention (1VO, 2VO) are illustrated.

The solid line indicates the pressure trace in the accumulator passage if conventional closing element VO is used. Before opening of the intake valve, it is at a pressure level $p_1$, which is approximately 0.4 bar above ambient pressure $p_0$. This overpressure is reduced to the ambient pressure after opening of the intake valve, through which the residual exhaust gas is purged out of the combustion chamber of the cylinder, see the crosshatched region indicated with plus. While the piston moves toward bottom dead center, a partial vacuum is subsequently produced in the combustion chamber, which is indicated by a minus. However, before the cylinder has finally reached the bottom dead center, closing element VO is opened, due to which the partial vacuum also leads to the charging effect referred to as impulse charging in the combustion chamber, which is again at pressure level $p_1$. Closing element VO is closed before reaching this pressure level, however, so that combustion air for the next residual exhaust gas purging procedure is stored in the pressure passage. Therefore, it is necessary for closing element VO to have the extremely high sealing speeds initially described above.

In contrast to this, if a pressure accumulator according to the present invention is used, two closing elements 1VO and 2VO are in use. It is clear that closing element 1VO is opened at the same time as closing element VO in the prior art, but it is not closed before the intake valve, so that a higher overpressure results in the combustion chamber, but the ambient pressure prevails in the pressure passage, since this region of the intake passage no longer profits from the pressure impulse. During the time that now follows, in which the intake valve is closed, the first closing element may be closed comparatively slowly and second closing element 2VO may be opened. In this way, desired pressure $p_1$ may be built up via the pressure accumulator, the second closing element having to be closed again until opening of the intake valve. A pressure loss may be compensated simultaneously in this case, which would otherwise impair the effect of residual exhaust gas purging, as indicated by the broken line.

Figure 2:
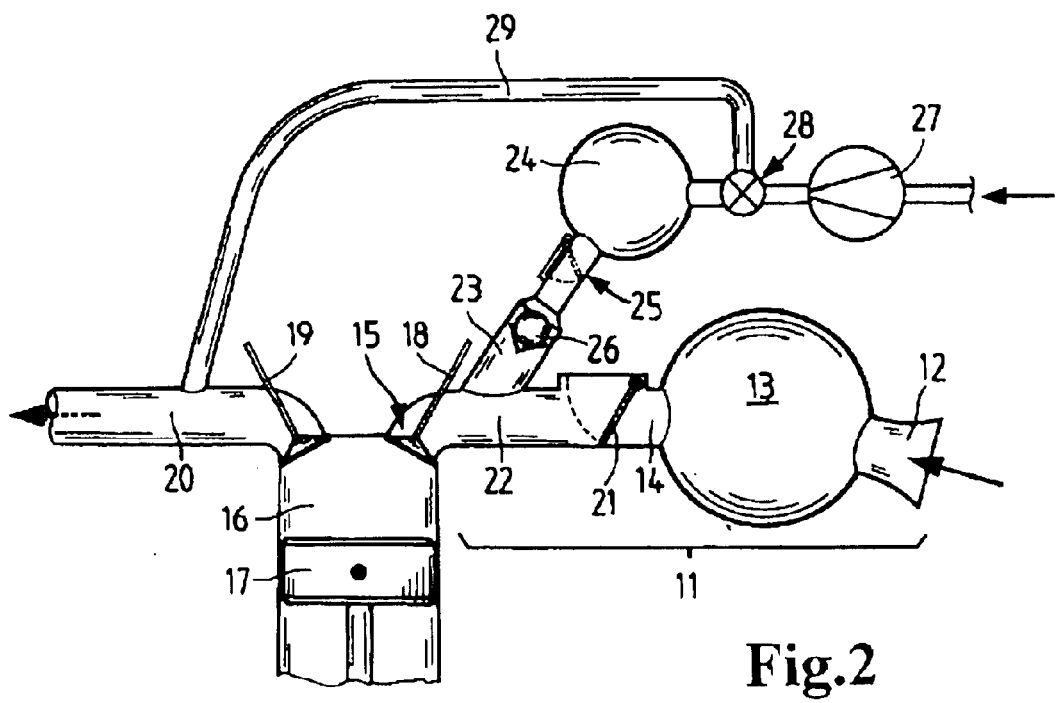
FIG. 2 is a schematic illustration of the structure of the intake device according to the present invention.

An apparatus according to the present invention for carrying out the method described with reference to FIG. 1 is illustrated in FIG. 2. As shown therein, intake tract 11 has an inlet 12, a collection chamber 13, a plurality of intake passages 14 originating from the collection chamber, one of which is illustrated in section, having an side outlet 15 leading to a cylinder 16 of the engine. Cylinder 16, having piston 17, has an intake valve 18 and an outlet valve 19, which leads to an exhaust system 20.

A first closing element 21 is positioned in intake passage 14, which, together with intake valve 18, separates off an accumulator passage 22 within intake passage 14. A connection line 23 to a pressure accumulator 24, which is separable from accumulator passage 22 by a second closing element 25 combined with a non-return valve 26, opens into the accumulator passage 22.

Pressure accumulator 24 is fed by a secondary air pump 27, which may also be used for secondary air injection into exhaust system 20 via a distributor valve 28 and a secondary air line 29. Secondary air pump 27 is unused over the greater period of the operation of the internal combustion engine, so that in typical operation, it is available for supplying pressure accumulator 24.

Figure 3:
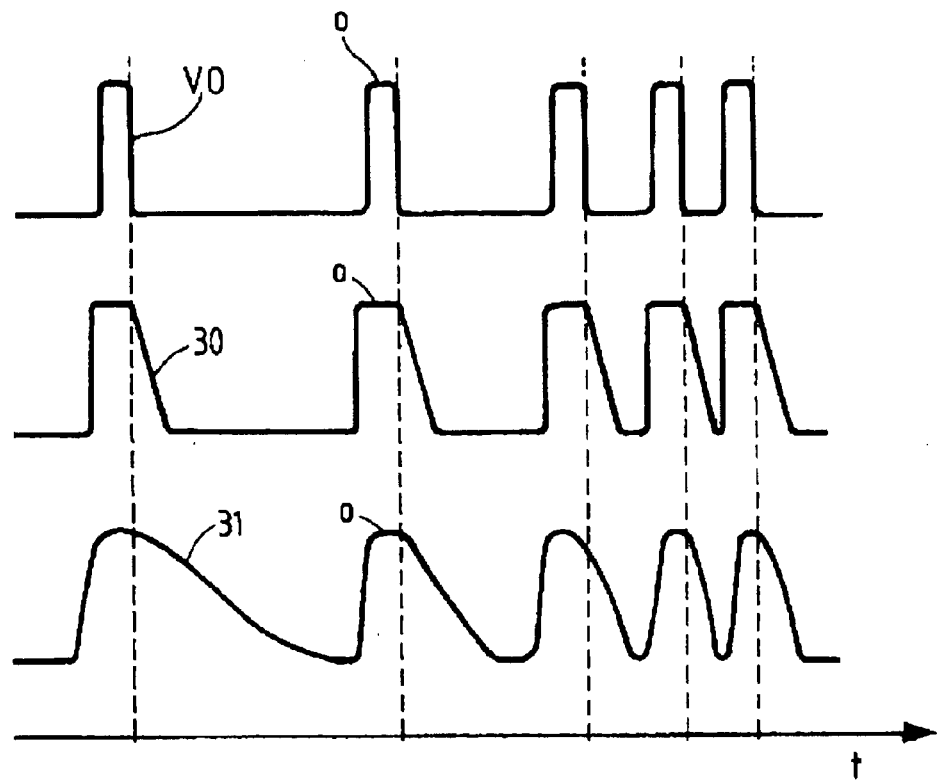
FIG. 3 is a graphic illustration of the switching characteristics of various first closing elements.

The switching operations of various flaps or valves over time are illustrated in FIG. 3. In this case, the broken lines show the switching intervals, which, as shown in FIG. 1, are at approximately 560° crank angle. The drawing depicts the characteristics of a closing element according to the prior art (VO), of a pivot flap 30 as shown in FIG. 2, and of a disk 31 as described hereinafter with reference to FIG. 4. It can be seen that the extremely short closing times of closing element VO do not have to be maintained for pivot flap 30 due to the switching behavior for 1VO described in FIG. 1. Since, as shown, at higher speeds the intervals become shorter and shorter over time t, the closing time must, however, be at least so short that the closing procedure is completed by the next opening. In this case, the speed limits of the internal combustion engine are the controlling factor. Closing element VO and pivot flap 30 share the feature that the switching procedure is always equally long, independent of the speed (in relation to open flap, indicated with o).

The switching characteristic of disk 31, which rotates at a speed proportional to the speed of the internal combustion engine, differs from this. This switching principle only becomes possible through the switching behavior according to the present invention shown in FIG. 1. The disk is designed so that the opening occurs over a very short period of time (steep ramp). The closing time selected may be longer. It has been shown that the closing time is also variable due to the variable rotational speed of the disk. This is also true in principle for the opening time, however, the slope of the ramp is so steep that the speed difference is not significant. It is merely necessary to ensure that the switching procedure still occurs sufficiently rapidly at low speeds, since it is only reduced further at higher speeds.

Figure 4:
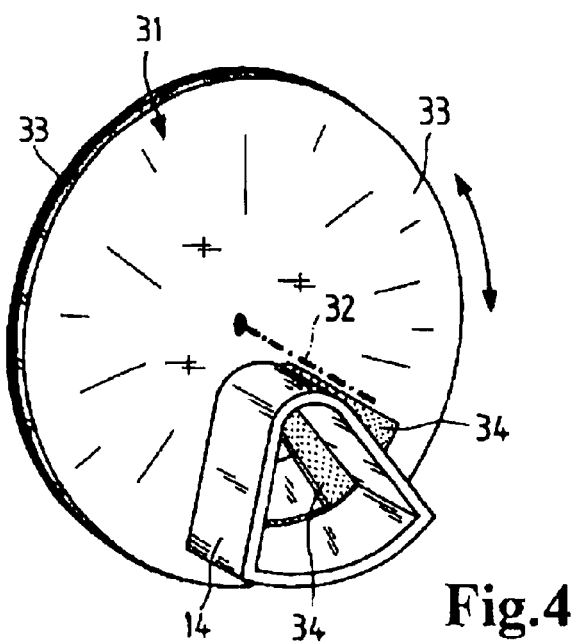
FIG. 4 is a schematic perspective view of a closing element comprising a rotary disk.

Disk 31 is schematically illustrated in FIG. 4 together with a section of intake passage 14. The disk has an axis of rotation 32, around which it may rotate. To be precise, the example shown in FIG. 4 is a disk which is constructed from two partial disks 33. These partial disks have apertures 34, which, if they are appropriately synchronized, enable a reduction of the switching times.

Figure 5:
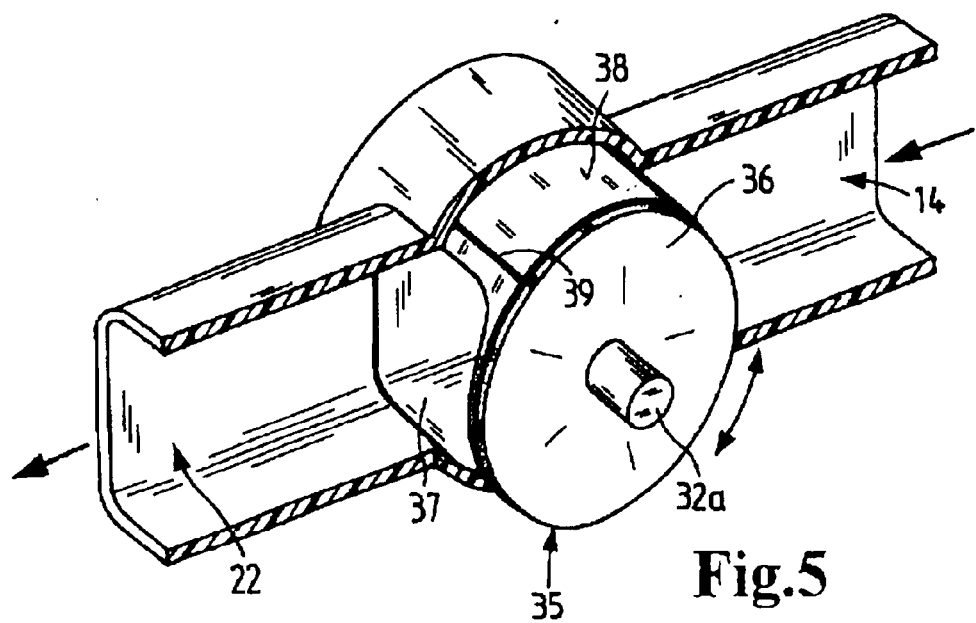
FIG. 5 is a schematic perspective view of a rotary valve.

The manner of operation of a rotating rotary valve 35 may be seen schematically in FIG. 5. It has an axis of rotation 32a and comprises a cylinder 36 which extends through the intake passage 14. Depending on the angular position of the rotary valve, an opening 37 in cylinder 36 leads to flow through the cross-section of intake passage 14 or to closure of passage 14 by a lateral surface 38 of the cylinder, which may be provided with seals 39 for this purpose.

Figure 6:
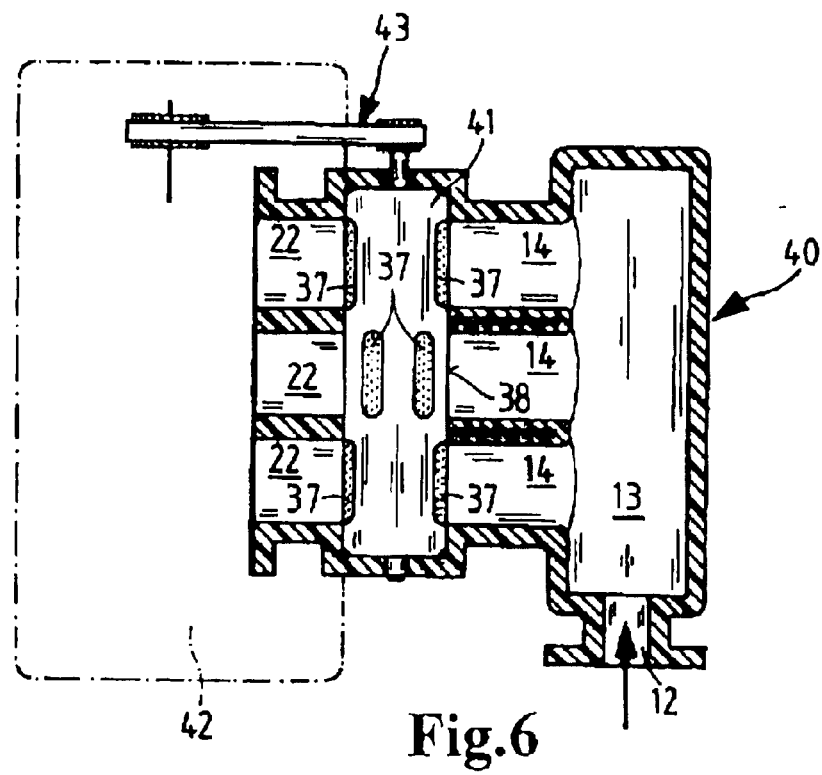
FIG. 6 illustrates the arrangement of multiple rotary valves on a common switching roller.

FIG. 6 shows how multiple rotary valves of an intake manifold 40 having three intake passages 14 may be integrated into a single common roller body 41. An internal combustion engine 42, which produces a continuous rotation of the roller body in proportion to the speed of the internal combustion engine via a belt drive 43, is also illustrated.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. An intake device for an internal combustion engine, said intake device comprising:
   an inlet for combustion air,
   at least one intake passage per cylinder of the internal combustion engine, which extends to an outlet for connection to an engine cylinder intake;
   an intake valve for closing each outlet;
   a first closing element positioned in the intake passage downstream of the intake valve, said first closing element forming an accumulator passage from a part of the intake passage between said first closing element and the intake valve,
   a pressure accumulator which is connected to the accumulator passage via a connection passage, and
   a second closing element positioned in said connection passage;
   wherein the pressure accumulator is fed by a secondary air pump, and said secondary air pump also introduces fresh air into an exhaust system of the internal combustion engine.

2. An intake device according to claim 1, wherein the second closing element comprises a non-return valve.

3. An intake device according to claim 1, wherein said second closing element comprises a shut off valve.

4. An intake device according to claim 1, wherein the first closing element comprises a pivot flap.

5. An intake device according to claim 4, wherein the pivot flap has a pivot axis which lies outside the cross-section of the intake passage through which intake air flows, and the pivot flap closes by pivoting in a direction corresponding essentially to the direction of flow of the intake air in the intake passage.

6. An intake device according to claim 1, wherein the first closing element comprises a rotatable disk which completely intersects the cross-section of the intake passage and which has an axis of rotation lying outside the cross-section of the intake passage, said disk having an aperture therein which at least partially opens the cross-section of the intake passage as a function of the angular position of the rotatable disk.

7. An intake device according to claim 1, wherein the first closing element comprises a rotary valve.

8. An intake device for an internal combustion engine, said intake device comprising:
   an inlet for combustion air,
   at least one intake passage per cylinder of the internal combustion engine, which extends to an outlet for connection to an engine cylinder intake;
   an intake valve for closing each outlet;
   a first closing element positioned in the intake passage downstream of the intake valve, said first closing element forming an accumulator passage from a part of the intake passage between said first closing element and the intake valve, a pressure accumulator which is connected to the accumulator passage via a connection passage, and a second closing element positioned in said connection passage;

wherein the first closing element comprises a rotatable disk which completely intersects the cross-section of the intake passage and which has an axis of rotation lying outside the cross-section of the intake passage, said disk having an aperture therein which at least partially opens the cross-section of the intake passage as a function of the angular position of the rotatable disk;

wherein a plurality of parallel intake passages are provided, each intake passage having a rotary valve, and wherein the rotary valves lie on a common axis of rotation and are integrated into a shared roller body.

9. An intake device according to claim 8, wherein the second closing element comprises a non-return valve.

10. An intake device according to claim 8, wherein said second closing element comprises a shut off valve.

11. An intake device according to claim 8, wherein the pressure accumulator is fed by a secondary air pump, and said secondary air pump also introduces fresh air into an exhaust system of the internal combustion engine.

12. An intake device for an internal combustion engine, said intake device comprising:

an inlet for combustion air, at least one intake passage per cylinder of the internal combustion engine, which extends to an outlet for connection to an engine cylinder intake;

an intake valve for closing each outlet;

a first closing element positioned in the intake passage downstream of the intake valve, said first closing element forming an accumulator passage from a part of the intake passage between said first closing element and the intake valve, a pressure accumulator which is connected to the accumulator passage via a connection passage, and a second closing element positioned in said connection passage;

wherein the first closing element comprises a rotatable disk which completely intersects the cross-section of the intake passage and which has an axis of rotation lying outside the cross-section of the intake passage, said disk having an aperture therein which at least partially opens the cross-section of the intake passage as a function of the angular position of the rotatable disk, and wherein the first closing element is driven by direct mechanical transfer of torque from a component of the internal combustion engine which rotates as a function of the speed of the internal combustion engine.

13. An intake device according to claim 12, wherein the pressure accumulator is fed by a secondary air pump, and said secondary air pump also introduces fresh air into an exhaust system of the internal combustion engine.

14. An intake device according to claim 12, wherein the second closing element comprises a non-return valve.

15. An intake device according to claim 12, wherein said second closing element comprises a shut off valve.

\* \* \* \* \*